United States Patent [19]

Beal et al.

[11] Patent Number: 5,262,249

[45] Date of Patent: Nov. 16, 1993

[54] INTERNALLY COOLED PROTON EXCHANGE MEMBRANE FUEL CELL DEVICE

[75] Inventors: Daniel W. Beal, East Hartford; Richard D. Breault, Coventry, both of Conn.

[73] Assignee: International Fuel Cells Corporation, South Windsor, Conn.

[21] Appl. No.: 813,463

[22] Filed: Dec. 26, 1991

[51] Int. Cl.⁵ .............................................. H01M 8/04
[52] U.S. Cl. .................................... 429/26; 429/30; 429/33
[58] Field of Search ............................. 429/26, 30, 33

[56] References Cited

U.S. PATENT DOCUMENTS 4,973,530  11/1990  Vanderborgh et al. ............... 429/13
4,988,583   1/1991  Watkins et al. ....................... 429/30

Primary Examiner—Prince Willis, Jr.
Assistant Examiner—M. Nuzzolillo
Attorney, Agent, or Firm—Peter R. Ruzek

[57] ABSTRACT

An internally cooled proton exchange membrane fuel cell device includes a fuel cell including a pair of substantially coextensive electrode components each of which includes a porous central region and a fluid-impermeable peripheral region circumferentially completely surrounding the central region, and a proton exchange membrane component interposed between at least the central regions of the electrode components. The fuel cell device further includes an arrangement for cooling the fuel cell, including at least one enclosed cooling channel situated at the peripheral region of one of the electrode components and supplied with fresh cooling medium, with the spent cooling medium being discharged from the cooling channel. There is further provided a heat transfer device that is operative to transfer heat from the central region to the peripheral region of the one electrode component. This heat transfer device advantageously includes a hermetically sealed casing and, within the casing, a quantity of a heat transfer substance of the type that evaporates at temperatures below those reached by a central zone of the casing during the operation of the fuel cell and condenses at temperatures above those prevailing at a peripheral zone of the casing during the operation of the cooling arrangement.

9 Claims, 1 Drawing Sheet

INTERNALLY COOLED PROTON EXCHANGE MEMBRANE FUEL CELL DEVICE

The Government has rights in this invention pursuant to a contract awarded by the Department of the Air Force.

TECHNICAL FIELD

The present invention relates to fuel cells in general, and more particularly to internally cooled proton exchange membrane fuel cell devices.

BACKGROUND ART

There are already known various constructions of fuel cells, among them such employing a proton exchange membrane confined between respective cathode and anode electrode plates. The general principles of construction and operation of such fuel cells are so well known that they need not be discussed here in any detail. Suffice it to say that a gaseous fuel and an oxidizing gas are supplied to the anode electrode plate and to the cathode electrode plate, respectively, and distributed as uniformly as possible over the active surfaces of the respective electrode plates (that is, the electrode plate surfaces facing the proton exchange membrane, each of which is usually provided with a layer of a catalyst), and that an electrochemical reaction takes place at and between such electrode plates, with attendant formation of a product of the reaction between the fuel and oxygen (product water), release of thermal energy, creation of an electrical potential difference between the electrode plates, and travel of electric charge carriers between the electrode plates, with the thus generated electric power usually constituting the useful output of the fuel cell.

In the proton exchange membrane fuel cells of the type here consideration, each of the electrode plates typically includes a backing plate having a relatively substantial thickness and a separate relatively thin support plate that is provided with the catalyst layer at an active region of one of its major surfaces (referred to herein as the front surface) and that overlies at least a central portion of the backing plate. These backing and support plates have one thing in common, namely, that they are porous. Such porosity is needed to supply to and substantially uniformly distribute over the respective active surface the respective gaseous medium which is fed through respective channels provided in the backing plate to areas of the respective electrode plate that are spaced from the proton exchange membrane, but also to provide for removal of the reaction product (water) from one of the active surfaces and supply water to the other of the active surfaces to avoid drying out of the proton exchange membrane thereat.

It will be appreciated that, when porous elements such as the aforementioned electrode plates are used in fuel cells, it is necessary to assure that neither any liquid, nor any of the gaseous media, be able to flow out of the periphery of the respective porous element. Therefore, it is customary to accommodate the various fuel cell components in solid (fluid impermeable) frames. Furthermore, it has been proposed, in copending commonly owned U.S. applications Ser. No. 07/813,464 and/or Ser. No. 07/813,472 to make the peripheral regions of such porous fuel cell components fluid impermeable by impregnating them with respective initially flowable substances that eventually solidify in the pores of such regions to completely fill such pores.

During the operation of the proton exchange membrane fuel cell, an electrochemical reaction takes place in the fuel cell between fuel and oxygen, resulting in the generation of an electric power. This reaction is exothermic, that is, heat is released in the course of its performance. The thus released heat must be removed from the fuel cell to avoid overheating of the latter. Currently, it is customary to interpose fully sealed cooling plates at spaced locations of the fuel cell assembly or stack, and to force a cooling medium through the interiors of such cooling plates. This cooling medium, in turn, is ordinarily cooled by another coolant, in a two-stage arrangement that necessitates the use of a multitude of devices, such as pumps, accumulators, heat exchangers or the like, to accomplish the desired purpose. This makes the arrangement very complicated and expensive. Moreover, experience has shown that, when the weight of such additional equipment is taken into account, as it must be, when considering the performance of the fuel cell arrangement, the end result is that the weight per unit of electrical output is undesirably high.

Accordingly, it is a general object of the present invention to avoid the disadvantages of the prior art.

More particularly, it is an object of the present invention to provide a cooled proton exchange membrane fuel cell device which does not possess the drawbacks of the known fuel cell devices of this kind.

Still another object of the present invention is to develop the proton exchange membrane fuel cell device of the above kind in such a manner as to minimize the weight per unit of electric power generated thereby.

A concomitant object of the present invention is to devise a proton exchange membrane device with a simpler and more efficient cooling system than heretofore used in similar fuel cell devices.

It is yet another object of the present invention to design the cooled fuel cell device of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in an internally cooled proton exchange membrane fuel cell device which includes a fuel cell including a pair of substantially coextensive electrode components each including a porous central region and a fluid-impermeable peripheral region circumferentially completely surrounding the central region, and a proton exchange membrane component interposed between at least the central regions of the electrode components. According to the present invention, the fuel cell device further includes means for cooling the fuel cell, including means for bounding at least one enclosed cooling channel at the peripheral region of one of the electrode components, and means for admitting fresh cooling medium into and discharging spent cooling medium from the cooling channel.

In accordance with another aspect of the present invention, there is further provided means for transferring heat externally of the fuel cell from the central region to the peripheral region of the one electrode component, such heat transferring means advantageously including a hermetically sealed casing having central and peripheral zones respectively juxtaposed with the central and peripheral regions of the one electrode component and, within the casing, a quantity of a heat transfer substance of the type that evaporates at temperatures below those reached by the central zone during the operation of the fuel cell and condenses at temperatures above those prevailing at the peripheral zone during the operation of the cooling means.

BRIEF DESCRIPTION OF THE DRAWING

The present invention will be described in more detail below with reference to the accompanying drawing, in which.

BEST MODE FOR CARRYING OUT THE INVENTION

Figure 1:
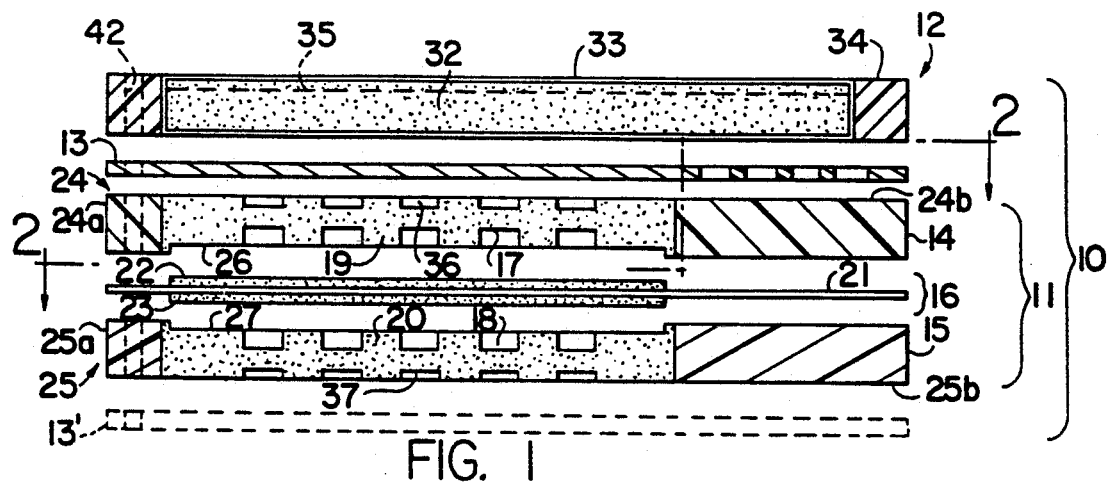
FIG. 1 is a partially exploded cross-sectional view of an exemplary construction of a proton exchange membrane fuel cell device embodying the present invention, taken on line 1—1 of FIG. 2.

Referring now to the drawing in detail, and first to FIG. 1 thereof, it may be seen that the reference numeral 10 has been used therein to identify an example of a construction of a proton exchange fuel cell device embodying the present invention. The fuel cell device 10 as illustrated there in an exploded condition includes a proton exchange fuel cell 11 proper, a heat transfer device 12, and a separator plate 13 interposed between the fuel cell 11 and the heat transfer device 12. However, it should be understood that, while the separator plate 13 has been shown and described as being a discrete component separate from both the fuel cell 11 and the heat transfer device 12, it could in fact constitute, as also contemplated in accordance with the present invention, an integral part or portion of either one of them, especially of the fuel cell 11.

Another component 13' is indicated in broken lines below the fuel cell 11 for the sake of completeness. This component 13' may be constituted, as shown, by a solid separator plate that is interposed between the fuel cell 11 and a similar or identical fuel cell situated underneath the illustrated fuel cell 11 in a fuel cell stack or assembly. Here again, the separator plate 13' could be constituted by a part or portion of the fuel cell 11. In an alternative, another solid fuel cell assembly component could be disposed at this location instead, depending on the construction of the fuel cell assembly or stack.

The fuel cell 11 includes, as its main components, two backing plates 14 and 15 and a proton exchange assembly or sandwich 16 which includes a proton exchange membrane 21 sandwiched between two support plates 22 and 23. When the respective component 13 or 13' forms, as mentioned before, a part of the fuel cell 11, then it may be constituted, to advantage, by an integral portion of the respective backing plate 14 or 15, respectively. While the proton exchange membrane sandwich 16 is shown in the exploded view of FIG. 1 as being in its assembled condition, it is to be understood that the support plates 22 and 23 could in fact be assembled with and/or secured to the respective backing plates 14 and 15, or even be constituted by integral portions thereof, just prior to the assembly of the fuel cell 11. However, in all cases, that is whether the support plates 22 and 23 are first assembled with or formed on the proton exchange membrane 21 or the respective backing plates 14 or 15, the sandwich 16 is interposed between and is in intimate contact with the backing plates 14 and 15 in the assembled condition of the fuel cell 11.

The backing plates 14 and 15 serve to transmit and withstand axial loads, to conduct electrical current and, in the illustrated construction, also to provide reactant gas channels, such as those indicated at 17 and 18 in FIG. 1 of the drawing, which are bounded and separated from one another by respective partition regions 19 and 20. Graphite is the material favored for the backing plates 14 and 15 that are to be used in the proton exchange membrane fuel cell environment, particularly for its good electrical conductivity, rather high electrochemical stability, light weight, and relatively low cost. However, graphite/polymer composite materials are also acceptable.

The backing plates 14 and 15 are constructed as porous bodies to enable or facilitate the distribution of the respective reactant gas to all regions of the respective catalyst that is situated at the surface of the proton exchange membrane 21 facing toward the respective backing plate 14 or 15, that is, even to those catalyst regions that are juxtaposed with the partition regions 19 or 20 or with other regions of the respective backing plate 14 or 15. Moreover, in solid polymer membrane fuel cells 11 with passive water flow management, the porosity of the backing plates 14 and 15 and of the support plates 22 and 23 is also being used to remove product water from one side, and to supply moisturizing water to the other side, of the proton exchange membrane 21, and to cause the formation of a wet seal that separates the reactant gases from the liquid water system.

However, the porosity of the backing plates 14 and 15 could have disadvantageous consequences if it were permitted to exist in edge regions of such backing plates 14 and 15. To avoid such undesirable consequences, such edge regions are made solid and both liquid and gas impermeable. In the proton exchange membrane fuel cell 11 shown in FIG. 1 of the drawing, this may be achieved in a manner that is disclosed in more detail in a commonly assigned copending U.S. patent application Ser. No. 07/813,464, the disclosure of which is incorporated herein by reference in its entirety so that no detailed explanation thereof need be provided here. Suffice it to say that the edge regions of the respective porous backing plates 14 and 15 are made solid and fluid impermeable by impregnating them with respective quantities of an initially flowable but solidifiable material that completely fills the pores of such edge regions and solidifies therein, thus in effect transforming the edge regions of the backing plates into solid, fluid impermeable portions of respective circumferentially complete integral frames 24 and 25, of which oppositely located frame portions 24*a* and 24*b*, and 25*a* and 25*b* are visible in FIG. 1. The integral frames 24 and 25 further include respective additional, non-illustrated frame portions that extend transversely of and are interconnected with the frame portions 24*a* and 24*b* or 25*a* and 25*b*, thus circumferentially completing the integral frames 24 and 25, respectively.

As already mentioned before, FIG. 1 of the drawing also shows that the proton exchange membrane 21 is sandwiched between the two support plates 22 and 23. However, the support plates 22 and 23 are shown to be smaller than the membrane 21 in this particular fuel cell construction, so that they are coextensive only with a central region of the membrane 21, that is the active region at which the electrochemical reaction takes place. As is well known, the support plates 22 and 23 may carry respective catalyst formations at their major surfaces facing the proton exchange membrane 21. However, such catalyst formations could be provided, instead or in addition, directly on the respective major surfaces of the proton exchange membrane 21.

Figure 2:
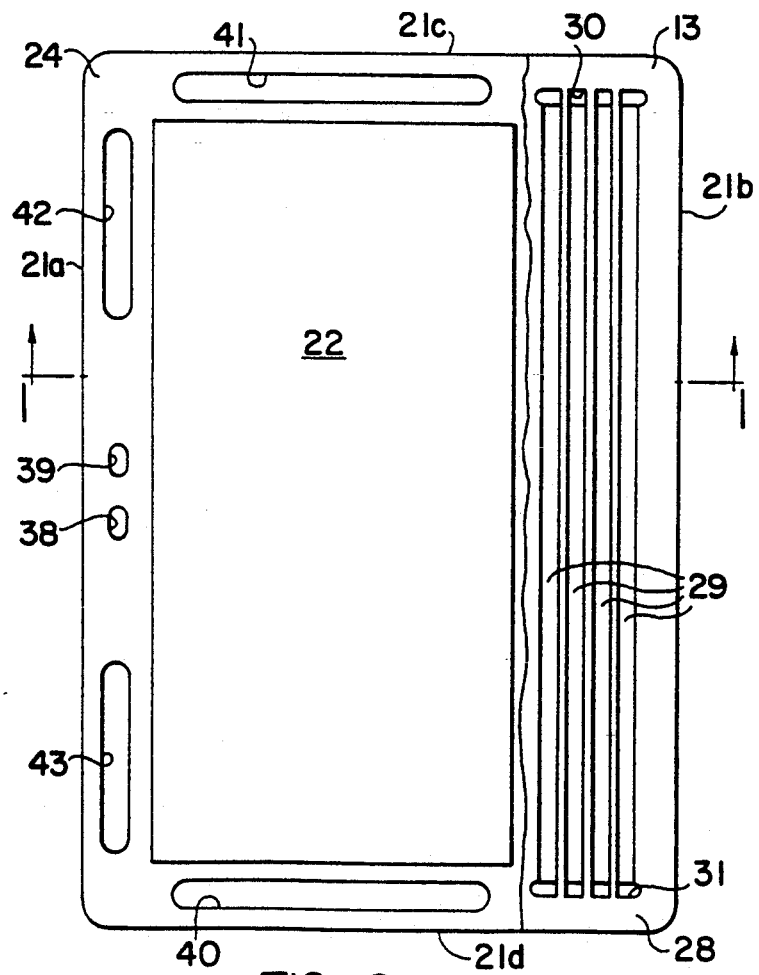
FIG. 2 is a partly sectioned top plan view of the fuel cell device of FIG. 1 at a somewhat different scale therefrom, taken on line 2—2 of FIG. 1.

The backing plates 14 and 15 are shown to be provided with respective recesses 26 and 27 that, in the assembled condition of the fuel cell 11, receive the porous support plates 22 and 23, respectively. The proton exchange membrane 21, on the other hand, is shown to extend not only over the central region of the fuel cell 11, but also in between the solid frame portions 24a and 25a, and 24b and 25b of the backing plates 14 and 15. As a matter of fact, the proton exchange membrane 21 is advantageously coextensive with, or even extends slightly beyond, the backing plates 14 and 15 in all directions. This is indicated in FIG. 2 of the drawing by the showing of relatively wide marginal portions 21a to 21d of the membrane 21, of which the marginal portions 21a and 21b extend between the solid integral frame portions 24a and 25a, and between the solid integral frame portions 24b and 25b of the backing plates 14 and 15, respectively, while the remaining marginal portions 21c and 21d are received between the non-illustrated additional frame portions of the backing plates 14 and 15.

Having so discussed the basic construction of the example of fuel cell construction in which the present invention can be used to advantage, the manner in which the invention is implemented in this particular construction will now be discussed in more detail with reference particularly to FIG. 2 of the drawing when viewed in conjunction with FIG. 1. It may be seen that the separator plate 13 includes a lateral portion 28 that is provided with a multitude of substantially coextensive and parallel channels 29 that are shown to be configured as through slots in the lateral portion 28, but could also advantageously extend through less than the entire thickness thereof. In any event, such channels 29 constitute respective cooling medium flow passages at least when the fuel cell device 10 is in its assembled condition. More particularly, in the assembled condition, the channels 29 are situated between the frame portion 24b, which is widened for this purpose relative to the frame portion 24a, on the one hand, and a side portion of the heat transfer device 12, on the other hand, so that any cooling medium present in such channels 29 can receive heat not only from the frame portion 24b but also, and possibly more importantly, from the juxtaposed portion of the heat transfer device 12. The cooling medium is caused to flow through the channels 29 by being admitted through one, and discharged through the other, of two ducts or manifolds 30 and 31 that are provided in and extend through the solid frame portions of the various components of the fuel cell device 10. The type of the cooling medium flowing through the channels 29 is chosen in such a manner as to be compatible with the fuel cell operating environment, such as pressure, temperature and so on. It is particularly advantageous to use water as the cooling medium not only because it is usually readily available but also, and possibly more importantly, because the use thereof minimizes contamination of the fuel cell due to the internal leakage of the cooling medium.

The aforementioned electrochemical reaction is exothermic, that is, heat is released during its performance. It will be appreciated that such released heat must be removed from the active region of the fuel cell 11 lest the temperature thereof rise to an unacceptable level. While the integral construction of the frames 24 and 25 with the remainders of the respective backing plates 14 and 15 improves heat transfer by conduction from the interior of the fuel cell 11 to its exterior, and hence also into the cooled frame portion 24 from where the cooling medium removes such heat, as compared with a construction including separate and mutually sealed backing plates and frames, reliance only on this type of conductive heat transfer would not be sufficient in many cases to avoid local overheating of the fuel cell 11, especially in the center thereof, even if the cooling channels were provided in all four of the edge portions of the fuel cell 11.

This potential problem is avoided, in accordance with the present invention, by using the aforementioned heat transfer device 12. As mentioned before, the heat transfer device 12 is being cooled by the cooling medium flowing through the channels 29 at a lateral portion thereof. The remainder of the heat transfer device 12, however, is in area contact with the remainder of the separator plate 13 which, in turn, is in area contact with the active region of the backing plate 14. Hence, heat transferred from the active region to the heat transfer device remainder is transferred in the heat transfer device 12 to the aforementioned lateral portion thereof where it is transferred to the cooling medium.

In accordance with an advantageous aspect of the present invention, the heat transfer device 12 is constructed as a heat pipe. As indicated in FIG. 1 of the drawing, the heat transfer device 12 used in the fuel cell device 10 of the present invention advantageously includes a porous body 32 that is fully and hermetically encased in a casing 33 advantageously made of metal foil of another electrically conductive but fluid impermeable material, such as of a solid graphite skin. The casing 33, in turn, is peripherally surrounded by a frame 34 made of, for instance, a synthetic plastic material. The interior of the casing 33, and particularly the porous body 32 disposed therein, contains a quantity of a heat transfer medium, such as water, that turns to vapor when heated to slightly below the operating temperature of the fuel cell 11 and to liquid on cooling to slightly above the temperature of the cooling medium flowing through the channels 29. The interior of the casing 33 is evacuated prior to or during the time that the aforementioned heat transfer medium is introduced thereinto, so as to bring the boiling point of such medium (water) into the desired operating temperature range of the fuel cell 11, advantageously substantially between 165° and 200° F. Thus, when liquid heat transfer medium reaches any region of the porous body 32 whose temperature is above the evaporation temperature of the heat transfer medium owing to its juxtaposition with the associated zone of the active region of the fuel cell 11, such medium is caused to evaporate (cooling such associated zone in the process), while the thus obtained heat transfer medium vapor condenses at the aforementioned lateral portion and thus delivers its latent heat contents (predominantly if not exclusively the heat of evaporation) to the cooling medium flowing through the cooling channels 29. The flow of the heat transfer medium vapor to the lateral portion of the device 12 is facilitated by providing the porous body 32 with at least one, but preferably more than one, flow channel 35 extending in the interior of the casing 33 substantially in parallelism with the plane of FIG. 1 of the drawing. The above process is then repeated due to the wicking of the liquid heat transfer medium through the pores of the porous body 32 and/or flow of the liquid heat transfer medium through the flow channel 35 to the relatively high-temperature zones of such body 32.

As a comparison of FIGS. 1 and 2 will reveal, the drawing depicts certain additional features of the fuel cell device 10 that are needed for its operation. So, for instance, the backing plates 14 and 15 are shown to be provided with water channels 36 and 37 that serve to supply moisturizing water to the anode side of the fuel cell 11 to prevent drying out of the membrane 21 at that side, and to discharge product water from the cathode side of the fuel cell 11. These water channels 36 and 37 are in communication, in a manner that is not shown in the drawing because it is well known, with respective water supply and discharge manifolds or ducts 38 and 39 provided in the frame region of the fuel cell device 10. Similarly, the frame region of the device 10 further includes oxidizing gas supply and discharge ducts or manifolds 40 and 41, as well as gaseous fuel (hydrogen-containing gas) supply and discharge ducts or manifolds 42 and 43, which are connected, again in a manner that is not shown in order not to unduly encumber the drawing, with the respective ones of the channels 17 and 18. On the other hand, sealing gaskets or other seals provided at the respective interfaces between the various fuel cell components to seal such interfaces, and electrical conductors for supplying the electric power generated in the fuel cell 11 during the operation thereof to a user, have been omitted from the drawing altogether, for the same reason.

The fuel cell construction incorporating the invention as described above is advantageous in many respects. For one, the construction is relatively simple in that the cooling channels 29 are provided directly in the frame portion of the fuel cell device 10. This is possible owing to the benign operating environment of the proton exchange membrane fuel cell 11 that is unlikely to introduce any contaminants into the cooling medium present in the cooling channels 29, even if the interface seals in question are less than leakproof. By the same token, contamination of the fuel cell by the cooling medium is also minimized, especially when the cooling medium is water. Another advantage, which stems from the above one, is that it is no longer necessary, as it was prior to the present invention, to provide an intermediate cooling loop using a different coolant. Thus, the expense of additional equipment, such as pump, accumulator, heat exchanger and other devices needed in a two-coolant system is avoided. Moreover, the weight of the device 10 per unit of active area is brought down potentially to the range of 1.5 to 2.5 lb per square foot of active area, especially due to the elimination of such now unnecessary ancillary equipment.

While the present invention has been illustrated and described as embodied in a particular construction of a proton exchange membrane fuel cell device, it will be appreciated that the present invention is not limited to this particular example; rather, the scope of protection of the present invention is to be determined solely from the attached claims.

We claim:

1. An internally cooled proton exchange membrane fuel cell device, comprising
    a fuel cell, including
        a pair of substantially coextensive electrode components each including a porous central region and a fluid-impermeable peripheral region circumferentially completely surrounding said central region, and
        a proton exchange membrane component interposed between at least said central regions of said electrode components; and
    means for cooling said fuel cell, including
        means for bounding at least one enclosed cooling channel juxtaposed with said peripheral region of one of said electrode components and sealingly separated from said porous central region of each of said electrode components, and
        means for admitting fresh cooling medium into and discharging spent cooling medium from said at least one enclosed cooling channel.

2. The fuel cell device as defined in claim 1, wherein said peripheral region of each of said electrode components is integral with said central region thereof.

3. The fuel cell device as defined in claim 1, wherein said bounding means includes a plate-shaped bounding component coextensive with at least said peripheral region of said one electrode component and at least partially delimiting said cooling channel.

4. An internally cooled proton exchange membrane fuel cell device, comprising
    a fuel cell, including
        a pair of substantially coextensive electrode components each including a porous central region and a fluid-impermeable peripheral region circumferentially completely surrounding said central region, and
        a proton exchange membrane component interposed between at least said central regions of said electrode components; and
    means for cooling said fuel cell, including
        means for bounding at least one enclosed cooling channel at said peripheral region of one of said electrode components, including a plate-shaped bounding component coextensive with at least said peripheral region of said one electrode component and at least partially delimiting said at least one enclosed cooling channel, said bounding component having a central portion juxtaposed with said central region and a peripheral portion overlapping said peripheral region of said one electrode component, and
        means for admitting fresh cooling medium into and discharging spent cooling medium from said at least one enclosed cooling channel.

5. The fuel cell device as defined in claim 4, wherein said bounding component is constituted by an integral part of said one electrode component.

6. The fuel cell device as defined in claim 4, and further comprising means for transferring heat externally of said fuel cell from said central region to said peripheral region of said one electrode component.

7. The fuel cell device as defined in claim 6, wherein said bounding component is constituted by an integral part of said heat transferring means.

8. The fuel cell device as defined in claim 6, wherein said heat transferring means includes a hermetically sealed casing having central and peripheral zones respectively juxtaposed with said central and peripheral portions of said additional component and, within said casing, a quantity of a heat transfer substance of the type that evaporates at temperatures below those reached by said central zone during the operation of said fuel cell and condenses at temperatures above those prevailing at said peripheral zone during the operation of said cooling means.

9. The fuel cell device as defined in claim 8, wherein said heat transferring means further includes a porous body accommodated in said casing and forming passageways for the flow of said heat transfer substance between said central and peripheral zones of said casing.

* * * * *